United States Patent
Marascu et al.

(10) Patent No.: US 10,552,540 B2
(45) Date of Patent: Feb. 4, 2020

(54) AUTOMATED APPLICATION COMPOSER WITH NATURAL LANGUAGE PROCESSING

(71) Applicant: International Business Machines Corporation, Armonk, NY (US)

(72) Inventors: Alice-Maria Marascu, Dublin (IE); Charles A. Jochim, Dublin (IE); Carlos A. Alzate Perez, Dublin (IE); Radu Marinescu, Dublin (IE); John E. Wittern, New York, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/822,323

(22) Filed: Nov. 27, 2017

(65) Prior Publication Data

US 2019/0163739 A1    May 30, 2019

(51) Int. Cl.
*G06F 17/27* (2006.01)

(52) U.S. Cl.
CPC ........ *G06F 17/2785* (2013.01); *G06F 17/271* (2013.01); *G06F 17/277* (2013.01); *G06F 17/2755* (2013.01)

(58) Field of Classification Search
CPC .... G06F 11/3664; G06F 8/30; G06F 11/3476; G06F 17/2785; G06F 17/28; G06F 17/289; G06F 17/278; G06F 16/90332; G06F 16/972; G06F 8/20; G06F 8/35; G06F 8/447; G06F 11/30; G06F 3/14; G06F 8/10; G06F 8/36; G06F 8/436; G10L 15/183;

(Continued)

(56) References Cited

U.S. PATENT DOCUMENTS 7,197,739 B2 * 3/2007 Preston ............... G06F 8/30
                                                    717/106
7,512,537 B2 * 3/2009 Pahud ............... G06T 13/00
                                                    704/9

(Continued)

FOREIGN PATENT DOCUMENTS

CA       2723005 A1    10/2001

OTHER PUBLICATIONS

Davidyuk, "Automated and Interactive Composition of Ubiquitous Applications", University of Oulu, 2012, ISBN 978-951-42-9838-7 (PDF), 102 pages.

(Continued)

*Primary Examiner* — Vijay B Chawan
(74) *Attorney, Agent, or Firm* — Nathan M. Rau

(57) ABSTRACT

An application automatically composed using natural language processing. A natural language input comprising one or more application requirements is received via an interface. The natural language input is parsed to extract one or more chunks, each chunk representing one of the application requirements, and at least one of the chunks representing at least one of one or more main functionalities described by the application requirements. A coarse architecture logically arranging the main functionalities to satisfy the application requirements is inferred according to the chunks. Existing assets corresponding to the chunks are identified, each asset associated with at least one of the main functionalities. The identified assets are assembled according to the coarse architecture. The assembled assets are deployed as an application.

20 Claims, 8 Drawing Sheets

(58) Field of Classification Search
CPC . G10L 15/1815; G10L 15/1822; G10L 15/22; G10L 15/063; G10L 15/26; G10L 15/30; G06N 20/00; G06N 21/23412; G06N 21/44012
USPC ....... 704/257, 8, 9, 235, 251, 255, 270, 275, 704/270.1, 4; 712/220; 717/106
See application file for complete search history.

(56) References Cited

U.S. PATENT DOCUMENTS

| | | | | |
|---|---|---|---|---|
| 8,346,563 | B1* | 1/2013 | Hjelm | G10L 15/1822 379/88.01 |
| 8,694,305 | B1* | 4/2014 | Grove | G06F 17/28 704/1 |
| 8,892,419 | B2* | 11/2014 | Lundberg | G06F 17/28 704/8 |
| 8,903,711 | B2* | 12/2014 | Lundberg | G06F 17/28 704/8 |
| 9,122,841 | B2* | 9/2015 | Pavlov | G06F 21/00 |
| 9,286,032 | B2* | 3/2016 | Feblowitz | G06F 8/20 |
| 9,529,572 | B1 | 12/2016 | Totale et al. | |
| 9,569,284 | B2 | 2/2017 | Contractor et al. | |
| 9,606,717 | B2 | 3/2017 | Matas | |
| 2005/0097224 | A1 | 5/2005 | Chen et al. | |
| 2008/0208583 | A1* | 8/2008 | Jan | G10L 15/1822 704/257 |
| 2008/0244236 | A1* | 10/2008 | Feblowitz | H04L 65/60 712/220 |
| 2014/0019116 | A1* | 1/2014 | Lundberg | G06F 17/28 704/8 |
| 2014/0229856 | A1 | 8/2014 | Lindsay et al. | |
| 2015/0205595 | A1 | 7/2015 | Dudai | |
| 2015/0261861 | A1 | 9/2015 | Li et al. | |
| 2016/0072737 | A1 | 3/2016 | Forster | |
| 2016/0139888 | A1 | 5/2016 | Iyer et al. | |
| 2017/0102861 | A1* | 4/2017 | Redenbach | G06F 3/14 |
| 2017/0116006 | A1 | 4/2017 | Salamatov et al. | |
| 2019/0034172 | A1* | 1/2019 | Kostello | G06F 8/20 |

OTHER PUBLICATIONS

Shiaa et al., "Towards the Automation of the Service Composition Process: Case Study and Prototype Implementations", Jan. 2008, Research Gate, 9 pages.

Cremene et al., "Service Composition based on Natural Language Requests", IEEE International Conference on Services Computing, 2009, DOI: 10.1109/SCC.2009.43, 4 pages.

TouchDevelop, © Copyright 2017 Microsoft, printed Sep. 19, 2017, 1 page. https://www.touchdevelop.com/app/.

Le et al., "SmartSynth: Synthesizing Smartphone Automation Scripts from Natural Language", MobiSys'13, Jun. 25-28, 2013, Taipei, Taiwan, Copyright 2013 ACM, 13 pages. https://www.microsoft.com/en-us/research/wp-content/uploads/2016/12/mobisys13.pdf.

MIT App Inventor, "Talk to Me (part 1), MIT App Inventor Tutorial #1", YouTube, Published Nov. 7, 2013, 2 pages. https://www.youtube.com/watch?v=Vdo8UdkgDD8#action=share.

MIT App Inventor, Explore MIT App Inventor, © 2012-2017 Massachusetts Institute of Technology, printed Sep. 19, 2017, 4 pages. http://appinventor.mit.edu/explore/.

Azaria et al., "Instructable Intelligent Personal Agent", Proceedings of the Thirtieth AAAI Conference on Artificial Intelligence (AAAI-16), Copyright 2016, Association for the Advancement of Artificial Intelligence (www.aaai.org), Feb. 2016, 9 pages.

Gvero et al., "Synthesizing Java Expressions from Free-Form Queries", Proceedings of the 2015 ACM SIGPLAN International Conference on Object-Oriented Programming, Systems, Languages, and Applications, Oct. 2015, 17 pages. http://laraserver.epfl.ch/~gvero/anycode.pdf.

Mell et al., "The NIST Definition of Cloud Computing", Recommendations of the National Institute of Standards and Technology, Special Publication 800-145, U.S. Department of Commerce, Sep. 2011, 7 pages.

* cited by examiner

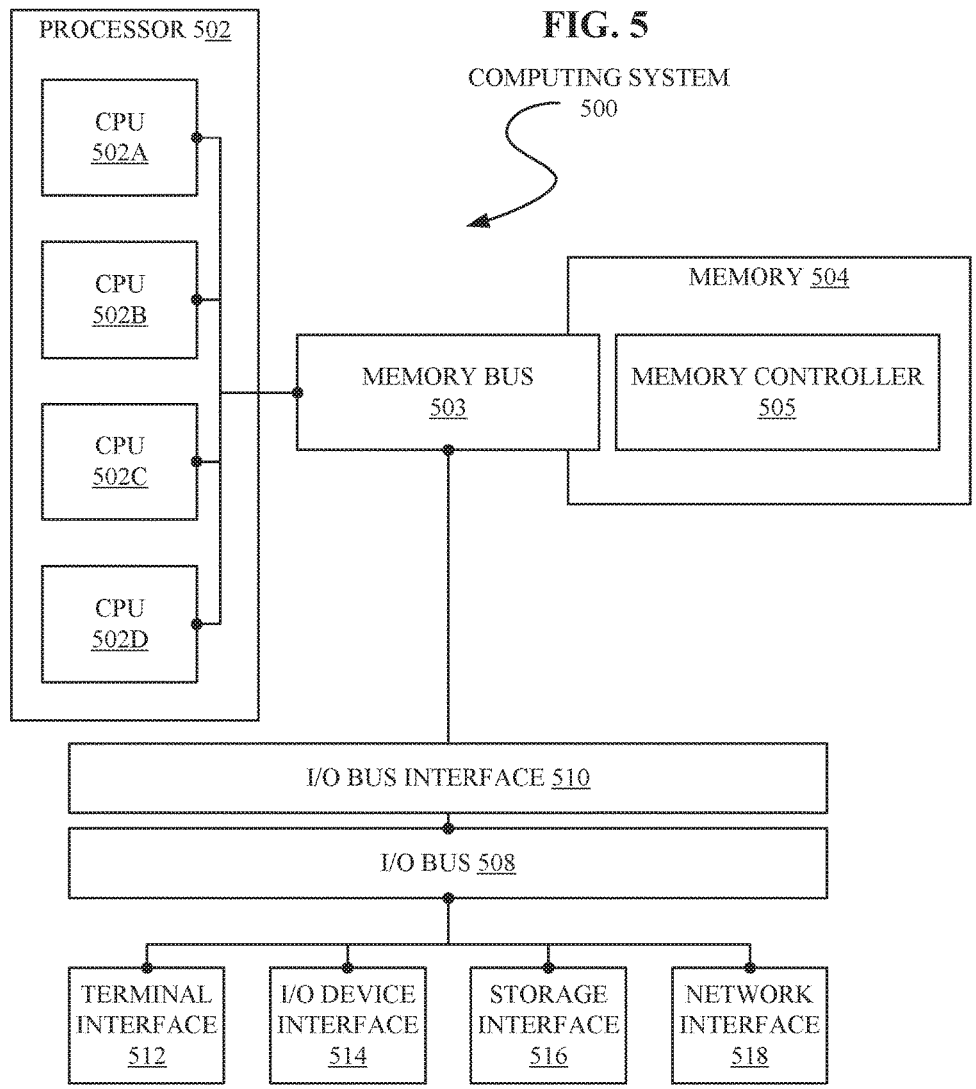

AUTOMATED APPLICATION COMPOSER WITH NATURAL LANGUAGE PROCESSING

BACKGROUND

The present disclosure relates to application composition, and more specifically, to automated application composition with natural language processing.

An application may be composed for any particular task that a user may desire a computer to perform. Due to the breadth of tasks they are designed to cover, application designs can be numerous and diverse.

Natural language processing is concerned with enabling machines to perceive and understand human language. Natural language processing is divided into a number of sub-areas, including syntax, semantics, discourse, and speech.

SUMMARY

According to embodiments of the present disclosure, automated application composition using natural language processing is described herein. A natural language input comprising one or more application requirements is received via an interface. The natural language input is parsed to extract one or more chunks, each chunk being a portion of the natural language input representing one of the one or more application requirements, and at least one of the one or more chunks representing at least one of one or more main functionalities described by the one or more application requirements. A coarse architecture logically arranging the one or more main functionalities to satisfy the one or more application requirements is inferred according to the one or more chunks. Existing assets corresponding to the one or more chunks are identified, each asset associated with at least one of the one or more main functionalities. The identified assets are assembled according to the coarse architecture. The assembled assets are deployed as an application.

A computing system and computer program product can embody the method and structures of the disclosure. The computing system can comprise a network, an interface, a memory configured to store natural language processing data and application assets, and a processor in communication with the memory. The computing system can be configured to perform the method.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

FIG. 5 depicts a high-level block diagram of an example computer system for implementing one or more of the methods or modules described herein, in accordance with embodiments of the present disclosure.

Figure 1:
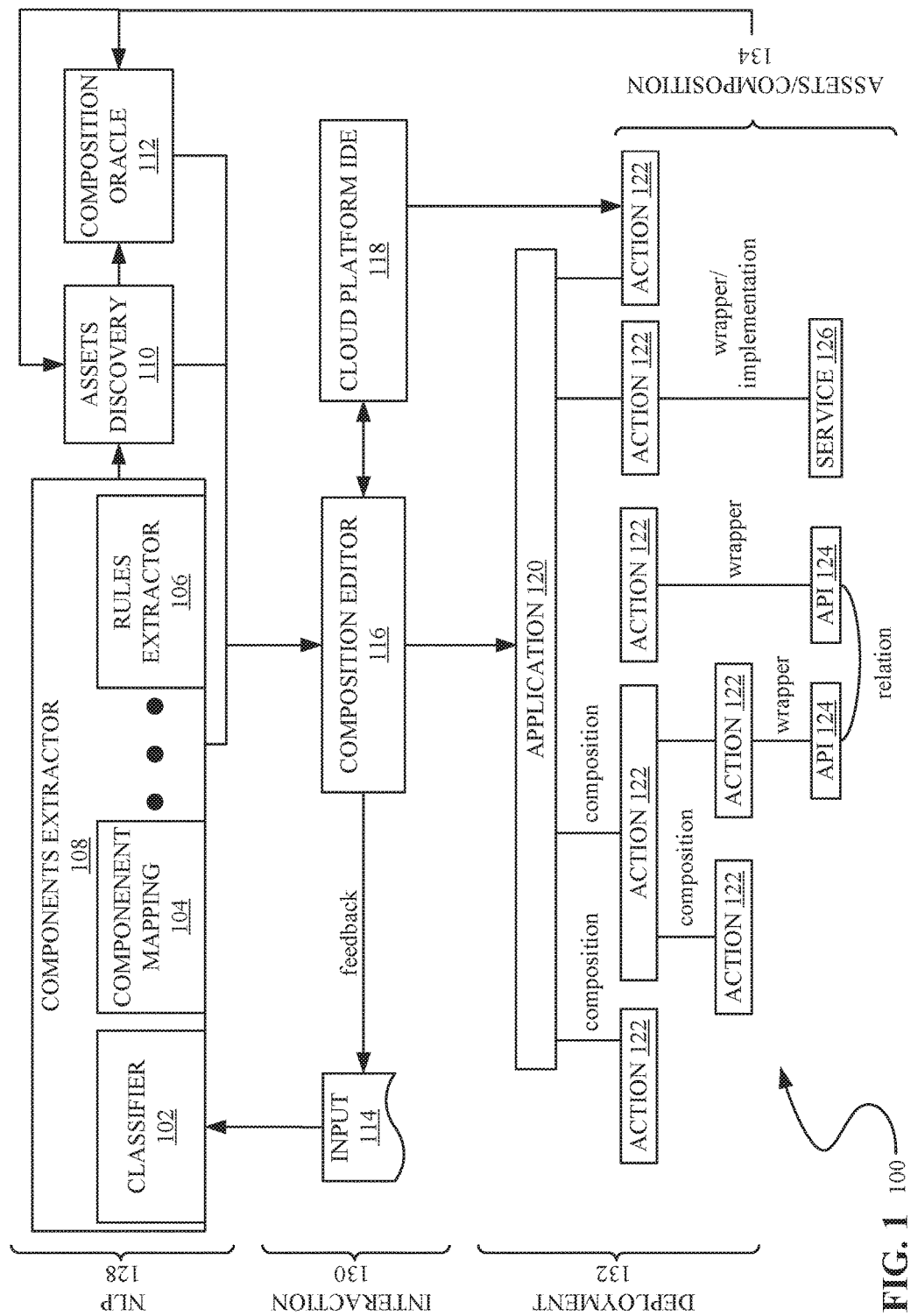
FIG. 1 depicts an example system for automated composition of an application using natural language processing, according to embodiments of the present disclosure.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the present disclosure relate to application composition, more particular aspects relate to automated application composition with natural language processing. While the present disclosure is not necessarily limited to such applications, various aspects of the disclosure may be appreciated through a discussion of various examples using this context.

Current application development systems rely heavily on human involvement, especially during early phases of application development. Humans are needed to understand the problem description the application is asked to solve and, further, to manually design and create the desired application. This can create a bottleneck in application development, as well suboptimal results, given the large number of applications desired in modern society and the numerous potential combinations for each application.

Disclosed herein is a method of automated application composition according to a natural language input. The natural language input may be in the form of a problem description, or may be a description of the desired functionality of the final application. The natural language input contains one or more application requirements, extracted by parsing the input into one or more chunks. Each chunk is a portion of the natural language input representing an application requirement. A coarse architecture is inferred by analyzing one or more main functionalities required by the application to be composed. The main functionalities may be determined according to the one or more application requirements. The coarse architecture may comprise a data flow determined according to the one or more chunks, such as by semantic matching with the natural language input. Existing assets are identified, each asset corresponding to one or more of the one or more main functionalities required by the application requirements. The identified assets are assembled according to the coarse architecture and the assembled assets are deployed as an application.

Two or more assets may be identified to achieve one of the one or more main functionalities. One of the two or more assets may be selected to be assembled into the applications, or two or more applications may be assembled, one incorporating each of the two or more identified assets. In embodiments, it may be determined that no existing asset provides the action or service required by a main functionality. The system may generate an alert indicating that a necessary asset is unavailable. In embodiments, the system may be further configured to generate or solicit an asset that cannot be located.

The data flow may be generated according to semantic matching with the one or more chunks. In embodiments, each of the one or more chunks may be analyzed to produce a first-order logic representation of the analyzed chunk. The first-order logic representations of the one or more chunks extracted from the parsing may, together, create a first-order logic representation of the application requirements, which may comprise the data flow.

The identified assets may be assembled by aligning the assets with the data flow. In embodiments, two or more data flows may be inferred from the one or more chunks parsed from the natural language input. One of the two or more data flows may be selected for assembling the assets, or two or more applications may be composed and deployed, one with each of the data flows.

A second natural language input may be received or generated in response to the deployed application. The second natural language input may be feedback on the deployed application, leading to the generation and deployment of a second application. The second application may be a more refined version of the first deployed application.

Disclosed herein is a computer system for automated application composition. The system includes a memory and a processor. The processor may perform the method as described above.

An asset may be a basic asset, such as an action (e.g., data visualization and confirmation or document classification), a service (e.g., a web service), or an application programming interface (an API, e.g., an email API or a speech-to-text API). In embodiments, an asset may be a complex asset, made up of two or more basic assets. Assets may be found in an internal repository which may be stored, for example, in the memory of the computer system. Assets may be found in an external repository with which the processor communicates. The external repository may be stored, for example, in a cloud storage.

The parsing of the natural language input may be analyzed according to phonology, morphology, lexicology, pragmatics, syntax, semantics, etc. The application composer may contain or interact with a natural language processing system. The natural language processing system may contain any number of modules for speech and language analysis. For example, the natural language processing system may include a phonology module to perform speech recognition. The phonology module may take as input an acoustic waveform and output a string of words.

Referring now to FIG. 1, depicted is a block diagram of an example system 100 for automated composition of an application using natural language processing, according to embodiments of the present disclosure. The system 100 may be organized into layers, such as, in this example, a natural language processing layer 128, an interaction layer 130, and a deployment/runtime layer 132.

The interaction layer 130 may receive the initial natural language input, such as input file 114. The input file 114 is submitted into the natural language processing layer 128. Natural language processing layer 128 may contain any number of natural language processing components, only some of which are depicted in this example. Natural language processing components may include semantic and syntactic parsers, a word-breaking or morphology module, which may coincide with component mapping 104, a tokenizer, a parts-of-speech tagger, relation extractions, logical form analysis, etc. In this example, natural language processing layer 128 is shown to contain at least a components extractor 108, which may contain subcomponents such as classifier 102, component mapping 104, and rules extractor 106. Components extractor 108 may focus on parsing the natural language input into chunks and identifying one or more main functionalities required for the final application and a corresponding data flow among the main functionalities.

Together the components of the components extractor 108 can parse the natural language input of the RFP 114 into chunks to determine the desired main functionalities and other application requirements.

Natural language processing layer 128 may contain an assets discovery module 110. Assets discovery module 110 may be concerned with search for and locating assets which coincide with application requirements, such as the required main functionalities, extracted from the input document 114.

Natural language processing layer 128 may further contain a composition oracle 112. Composition oracle 112 may be tasked with aligning assets identified by assets discovery 110 with a coarse architecture, such as a data flow, determined by components extractor 108, for example by component mapping module 104. In embodiments, the composition oracle 112 may determine the coarse architecture itself, or the composition oracle's duties may be restricted to determining a desired alignment for the identified assets.

The identified assets and composition may be output to a composition editor 116, along with relevant data extracted by the components extractor 108. The composition editor 116 is located within the interaction layer 130 to allow user interaction and manipulation of composition settings and arrangements. Composition editor 116 may perform the actions of arranging the assets identified by assets discovery 110 according to the composition determined by composition oracle 112. Composition editor 116 may provide feedback to the input document 114. Composition editor 116 may exchange information with a cloud platform integrated development environment (IDE) 118 (e.g. OpenWhisk). Composition editor 116 may incorporate or communicate with a display or other output device, and receive user commands via any number of input devices.

The cloud platform IDE 118 may provide a programming environment and runtime for the application components. Cloud platform IDE 118 may provide a write function and sharing for the deployed application, such as through interaction with a deployed action asset 122, in this example. This example uses a cloud platform IDE, but in embodiments other types of runtime platforms may be used, though generally a serverless technology may be preferable.

The composition editor 116 can output an application 120, composed of assets such as actions 122, APIs 124, and services 126. Together the application 120 and composed actions 122 may make up a deployment and runtime layer 132.

Feedback regarding the assets selected and the composition 134 can be provided back to the natural language processing layer 128, such as to update assets discovery 110 and composition oracle 112. In embodiments, feedback can be packaged and submitted as a new input document 114.

Figure 2:
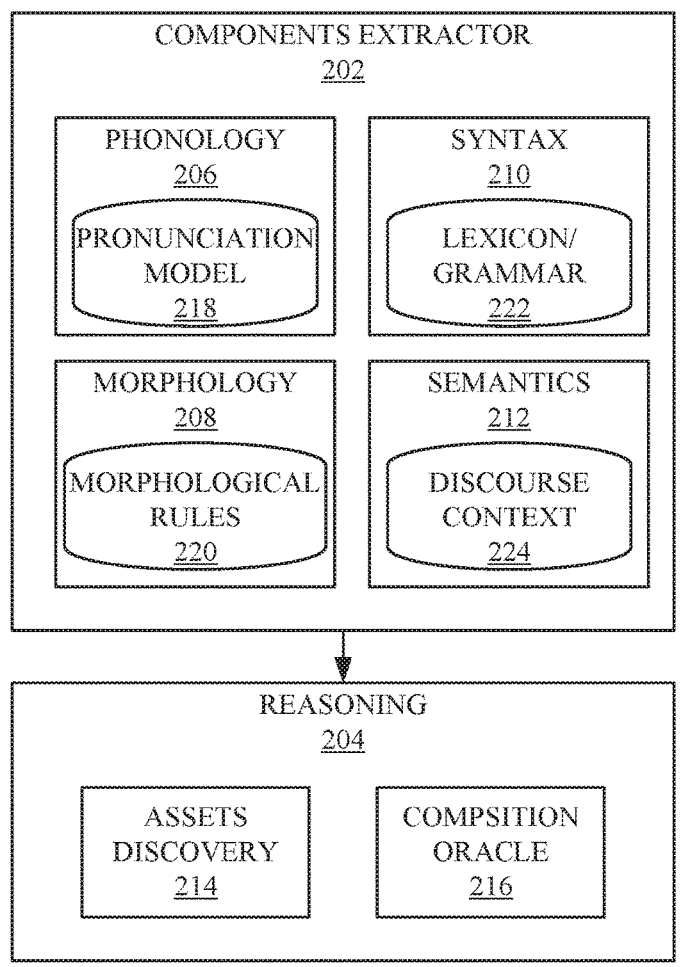
FIG. 2 depicts a block diagram of an example natural language processing system, according to embodiments of the present disclosure.

Referring now to FIG. 2, depicted is a block diagram of an example natural language processing system 200, according to embodiments of the present disclosure. In embodiments, natural language processing system 200 may make up all or part of a natural language processing layer in an application composition system, such as natural language processing layer 128 of application composition system 100 of FIG. 1.

Natural language processing system 200 may comprise a components extractor 202 and a reasoning module 204. In embodiments, the components extractor 202 may coincide with components extractor module 106 of FIG. 1. Components extractor 202 may contain any number of natural language processing units, specifically units designed for parsing and extraction. Components extractor 202 may contain, for example, a phonology module 206, a morphology module 208, a syntax module 210, and a semantics module 212. It is to be understood that the depicted organization of the natural language processing system 200 as an extractor module 202 and a reasoning module 204 as in FIG. 2 is to be non-limiting, as other possible organizations/configurations are possible. For example, a natural language processing system could comprise shallow parsing module and a deep parsing module, both or either of which may perform reasoning functions.

The modules 206, 208, 210, 212 of the components extractor 202 may rely upon database information for their analysis of a natural language input. The database information may be kept in a single storage location, either locally or remotely, shared among the natural language processing modules. In this example, each of the modules 206, 208, 210, 212 has an integrated database 218, 220, 222, 224 of natural language information for the module's particular function. Phonology module 206, which performs speech-to-text functions, has, for example, a pronunciation model 218 in its database. Morphology module 208, which deals with word formation and determining word meanings based on their structure, may have a database of morphological rules 220 to rely upon. Syntax module 210 may perform both lexical and syntactic analysis, and therefore require a database 222 containing both a lexicon and grammar rules. In embodiments, the syntax module 210 could use output from the morphology module 208. A semantics module 212 determines word meaning in relation to structures and other words in the sentence and/or paragraph. Semantics module 212 may have a database of discourse context 224 for reference. In embodiments, components extractor may contain any number of other modules, e.g. a tokenizer, a relation extractor, a pragmatics module, logical form analysis, etc.

Natural language processing system 200 may also contain a reasoning module 204 to make use of the parsed natural language input and extracted data. Reasoning module 204 may contain, for example, an assets discovery module 214 and a composition oracle 216. In embodiments, assets discovery module 214 and composition oracle 216 may coincide with assets discovery module 110 and composition oracle 112 of FIG. 1.

Assets discovery module 214 may receive output from components extractor 202 and locate assets to perform functions determined to be requested by the natural language input. In embodiments, assets discovery 214 may determine if the application requested requires an asset that does not exist. Assets discovery 214 may trigger a feedback to the user, indicating that further assets development is necessary. In embodiments, the feedback may specify the functionality or other requirement for which an asset could not be located.

Composition oracle 216 may receive output from components extractor 202 and determine an arrangement for the located assets to execute the desired functionality. In embodiments, composition oracle 216 may align located assets with a data flow extracted from the natural language input. The data flow may be a first-order logical progression derived from the natural language input. The data flow may be determined by the composition oracle 216 according to a set of rules relating to the located assets.

For example, if a user requests "An application to file a tax return using the tax related documents from a set of input documents," components extractor 202 may determine the required main functionality is identifying tax documents, locating parameters, a means of filing, and obtaining a confirmation. Assets discovery 214 may locate a natural language classifier asset to identify tax documents from among the input document set, a web service asset to look up parameters and perform the filing, and a data visualization and confirmation asset to obtain the filing confirmation. Assets may be identified by associated metadata, or by being located on an asset catalog inventory. In embodiments, the system may maintain a reference table associating each asset with one or more natural language main functionality descriptions.

Composition oracle 216 may receive the assets from asset discovery 214 and, referring to the output of components extractor 202, determine the natural language classifier is the input (and should therefore be placed first) and the data visualization and confirmation is the output (and should therefore be placed last). Accordingly, the composition oracle 216 may arrange the assets so that the final deployed application progresses through them from natural language classifier, to web service (between the input and the output), to data visualization and confirmation.

Figure 3:
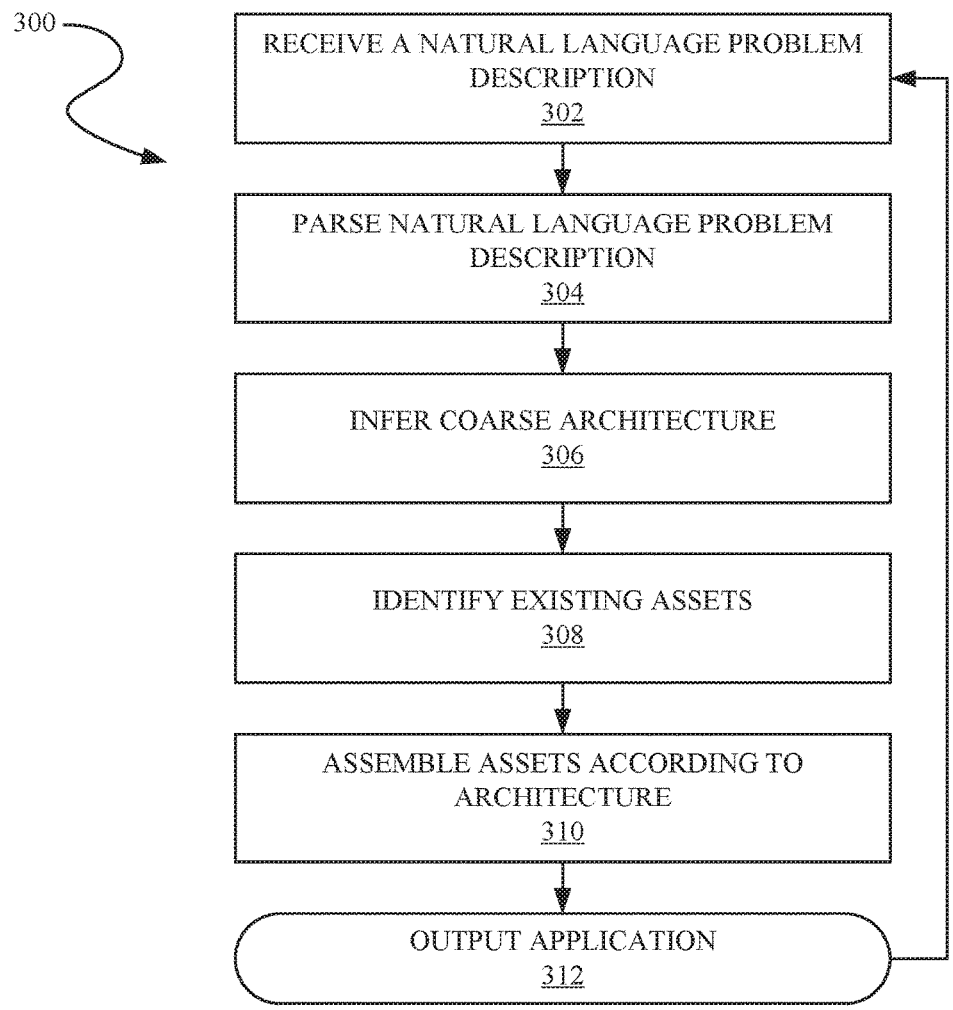
FIG. 3 depicts a flowchart of an example process for automatic composition of an application using natural language processing, according to embodiments of the present disclosure.

Referring now to FIG. 3, depicted is a flowchart of an example process 300 for automatic composition of an application using natural language processing, according to embodiments of the present disclosure. At least part of the process 300 may be carried out by a system such as system 100 of FIG. 1 and/or system 200 of FIG. 2. Execution of process 300 may be by one or more processors.

At operation 302, a natural language problem description is received, such as input document 114 of FIG. 1. At operation 304, the natural language problem description is parsed by a natural language processing system, such as natural language processing system 200 of FIG. 2. At operation 306, a coarse architecture of an application is inferred from the parsed natural language input. The architecture may be inferred by a composition oracle, such as composition oracle 112 of FIG. 1, or composition oracle 216 of FIG. 2. The coarse architecture provides a data flow for the arrangement of the identified assets and the performance of the desired functionality for the deployed application. The coarse architecture may be determined by semantic matching with the natural language input. In embodiments, the coarse architecture may be made up of a first-order logic representation of each chunk, wherein the coarse architecture comprises all the first-order logic representations of the one or more chunks.

At operation 308, existing assets are identified according to the parsed natural language input. The assets may basic assets, such as a service or an API, or a complex asset, such a combination of two or more assets. The assets may be identified by an assets discovery module, such as assets discovery 110 of FIG. 1, or assets discovery 214 of FIG. 2.

At operation 310, the assets are assembled according to the coarse architecture. The assets may be assembled in a user interactive environment, such as composition editor 116 of FIG. 1. In embodiments, the deployed application may serve as a template from which a more refined application may be developed. In embodiments, such refining may occur through the user interactive environment. At operation 312, the assembled assets are output as an application. The output application may provide or elicit feedback to refine the natural language problem description, at operation 302, leading to an improved output application, at operation 312, after the refined natural language problem description is parsed by the system and a corresponding refined application produced.

Figure 4:
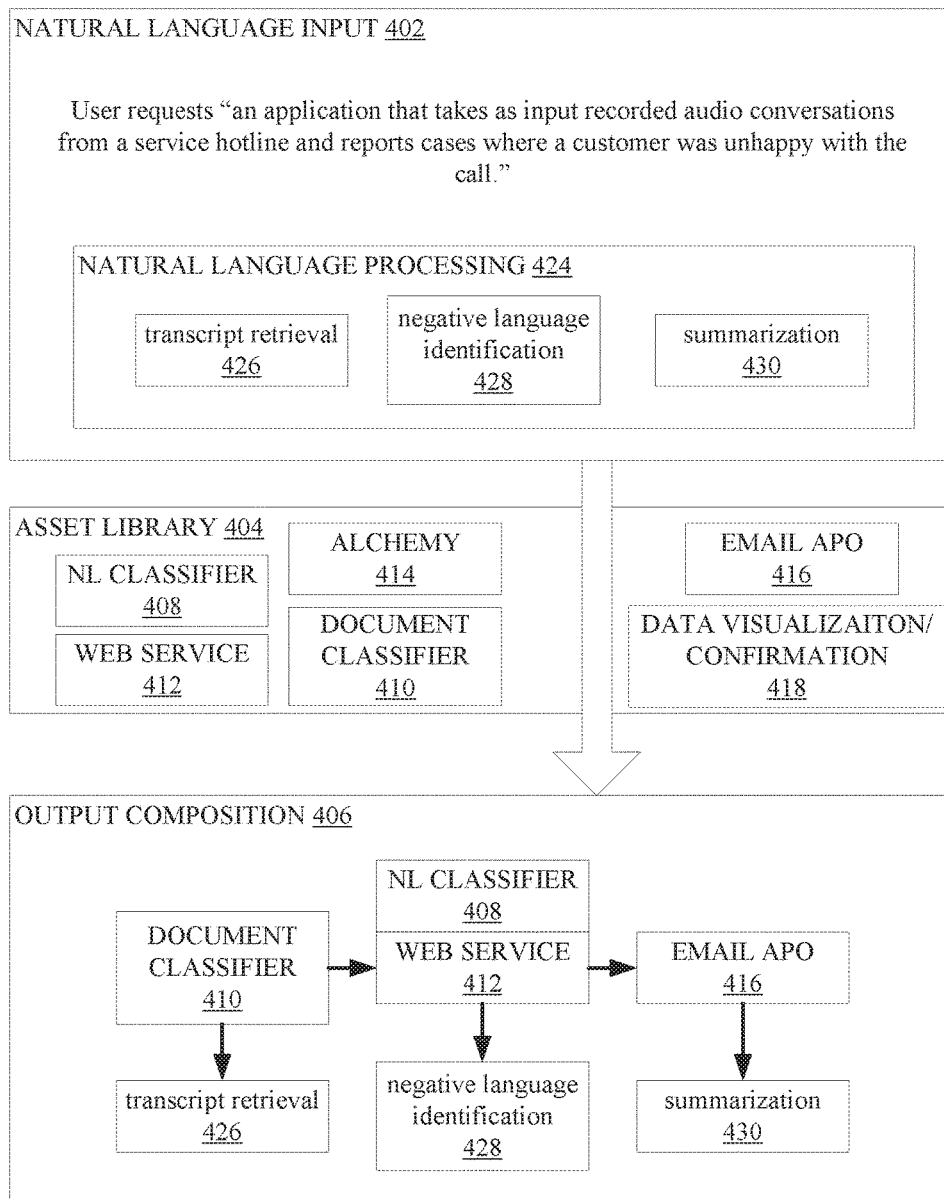
FIG. 4 depicts an example of an output application in response to a natural language problem description input, according to embodiments of the present disclosure.

Referring now to FIG. 4, depicted is an example of an output application 406 in response to a natural language problem description input 402, according to embodiments of the present disclosure. A natural language input 402 provides a problem description: the user requests, "an application that takes as input recorded audio conversations from a service hotline and reports cases where a customer was unhappy with the call." The natural language input 402 may be processed by a natural language processing system 424, such as natural language processing system 200 of FIG. 2. The natural language processing system can parse the natural language input 402 and extract necessary application requirements, such as main functionalities and a coarse architecture, for the final application. In this example, main functionalities "transcript retrieval" 426, "negative language identification" 428, and "summarization" 430 may be identified from natural language input 402. Together, the data flow progression from "transcript retrieval" 426, to "negative language identification" 428, to "summarization" 430, which may be derived from semantic matching to the natural language input 402, may provide the coarse architecture.

Referring to the main functionalities 426, 428, 430 extracted from natural language input 402, an asset library 404 may be accessed. Assets, such as, in this example, natural language classifier 408, web service 412, alchemy 414, document classifier 410, email APO 416, data visualization and confirmation 418, etc. may be compared with main functionalities to identify matches.

Matched assets can be seen in the output composition 406, where document classifier 410 is aligned for "transcript retrieval" 426, natural language classifier 408 and web service 412 are implemented together and aligned for "negative language identification" 428, and email APO 416 is aligned for "summarization" 430. The identified assets 410, 412, 416 are arranged according to the dataflow by aligning to the associated main functionality 426, 428, 430.

Referring now to FIG. 5, shown is a high-level block diagram of an example computer system (i.e., computer) 500 that may be used in implementing one or more of the methods or modules, and any related functions or operations, described herein (e.g., using one or more processor circuits or computer processors of the computer), in accordance with embodiments of the present disclosure. In some embodiments, the major components of the computer system 500 may comprise one or more CPUs 502, a memory subsystem 504, a terminal interface 512, an I/O (Input/Output) device interface 514, a storage interface 516, and a network interface 518, all of which may be communicatively coupled, directly or indirectly, for inter-component communication via a memory bus 503, an I/O bus 508, and an I/O bus interface unit 510.

The computer system 500 may contain one or more general-purpose programmable central processing units (CPUs) 502A, 502B, 502C, and 502D, herein generically referred to as the CPU 502. In some embodiments, the computer system 500 may contain multiple processors typical of a relatively large system; however, in other embodiments the computer system 500 may alternatively be a single CPU system. Each CPU 502 may execute instructions stored in the memory subsystem 504 and may comprise one or more levels of on-board cache.

In some embodiments, the memory subsystem 504 may comprise a random-access semiconductor memory, storage device, or storage medium (either volatile or non-volatile) for storing data and programs. In some embodiments, the memory subsystem 504 may represent the entire virtual memory of the computer system 500, and may also include the virtual memory of other computer systems coupled to the computer system 500 or connected via a network. The memory subsystem 504 may be conceptually a single monolithic entity, but, in some embodiments, the memory subsystem 504 may be a more complex arrangement, such as a hierarchy of caches and other memory devices. For example, memory may exist in multiple levels of caches, and these caches may be further divided by function, so that one cache holds instructions while another holds non-instruction data, which is used by the processor or processors. Memory may be further distributed and associated with different CPUs or sets of CPUs, as is known in any of various so-called non-uniform memory access (NUMA) computer architectures. In some embodiments, the main memory or memory subsystem 504 may contain elements for control and flow of memory used by the CPU 502. This may include a memory controller 505.

Although the memory bus 503 is shown in FIG. 5 as a single bus structure providing a direct communication path among the CPUs 502, the memory subsystem 504, and the I/O bus interface 510, the memory bus 503 may, in some embodiments, comprise multiple different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface 510 and the I/O bus 508 are shown as single respective units, the computer system 500 may, in some embodiments, contain multiple I/O bus interface units 510, multiple I/O buses 508, or both. Further, while multiple I/O interface units are shown, which separate the I/O bus 508 from various communications paths running to the various I/O devices, in other embodiments some or all of the I/O devices may be connected directly to one or more system I/O buses.

In some embodiments, the computer system 500 may be a multi-user mainframe computer system, a single-user system, or a server computer or similar device that has little or no direct user interface, but receives requests from other computer systems (clients). Further, in some embodiments, the computer system 500 may be implemented as a desktop computer, portable computer, laptop or notebook computer, tablet computer, pocket computer, telephone, smart phone, mobile device, or any other appropriate type of electronic device.

It is noted that FIG. 5 is intended to depict the representative major components of an exemplary computer system 500. In some embodiments, however, individual components may have greater or lesser complexity than as represented in FIG. 5, components other than or in addition to those shown in FIG. 5 may be present, and the number, type, and configuration of such components may vary.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 6A:
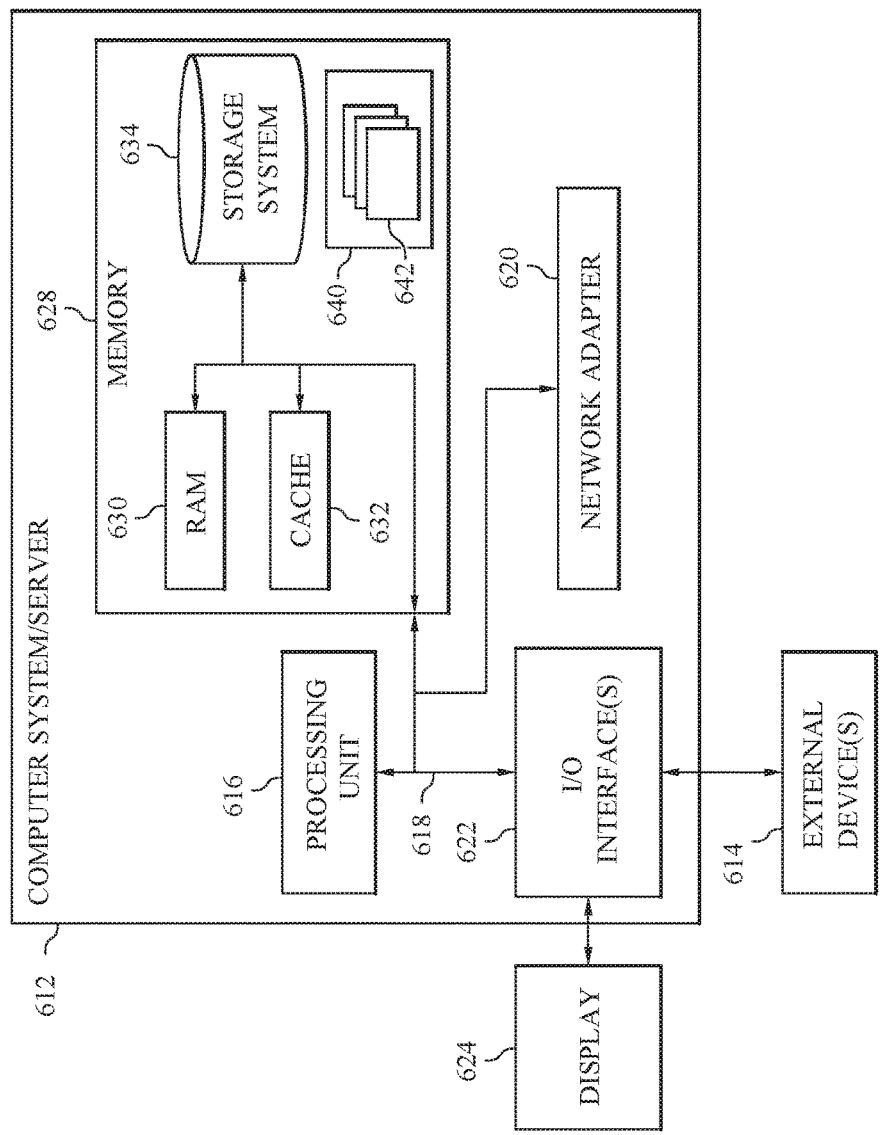
FIG. 6A depicts a schematic of an example of a cloud computing node.

Referring now to FIG. 6A, a schematic of an example of a cloud computing node is shown. Cloud computing node 610 is only one example of a suitable cloud computing node and is not intended to suggest any limitation as to the scope of use or functionality of embodiments of the invention described herein. Regardless, cloud computing node 610 is capable of being implemented and/or performing any of the functionality set forth hereinabove.

In cloud computing node 610 there is a computer system/server 612, which is operational with numerous other general purpose or special purpose computing system environments or configurations. Examples of well-known computing systems, environments, and/or configurations that may be suitable for use with computer system/server 612 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 612 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 612 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 6A, computer system/server 612 in cloud computing node 610 is shown in the form of a general-purpose computing device. The components of computer system/server 612 may include, but are not limited to, one or more processors or processing units 616, a system memory 628, and a bus 618 that couples various system components including system memory 628 to processor 616.

Bus 618 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 612 typically includes a variety of computer system readable media. Such media may be any available media that is accessible by computer system/server 612, and it includes both volatile and non-volatile media, removable and non-removable media.

System memory 628 can include computer system readable media in the form of volatile memory, such as random access memory (RAM) 630 and/or cache memory 632. Computer system/server 612 may further include other removable/non-removable, volatile/non-volatile computer system storage media. By way of example only, storage system 634 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 618 by one or more data media interfaces. As will be further depicted and described below, memory 628 may include at least one program product having a set (e.g., at least one) of program modules that are configured to carry out the functions of embodiments of the invention.

Program/utility 640, having a set (at least one) of program modules 642, may be stored in memory 628 by way of example, and not limitation, as well as an operating system, one or more application programs, other program modules, and program data. Each of the operating system, one or more application programs, other program modules, and program data or some combination thereof, may include an implementation of a networking environment. Program modules 642 generally carry out the functions and/or methodologies of embodiments of the invention as described herein.

Computer system/server 612 may also communicate with one or more external devices 614 such as a keyboard, a pointing device, a display 624, etc.; one or more devices that enable a user to interact with computer system/server 612; and/or any devices (e.g., network card, modem, etc.) that enable computer system/server 612 to communicate with one or more other computing devices. Such communication can occur via input/output (I/O) interfaces 622. Still yet, computer system/server 612 can communicate with one or more networks such as a local area network (LAN), a general wide area network (WAN), and/or a public network (e.g., the Internet) via network adapter 620. As depicted, network adapter 620 communicates with the other components of computer system/server 612 via bus 618. It should be understood that although not shown, other hardware and/or software components could be used in conjunction with computer system/server 612. Examples, include, but are not limited to: microcode, device drivers, redundant processing units, and external disk drive arrays, RAID systems, tape drives, and data archival storage systems, etc.

Figure 6B:
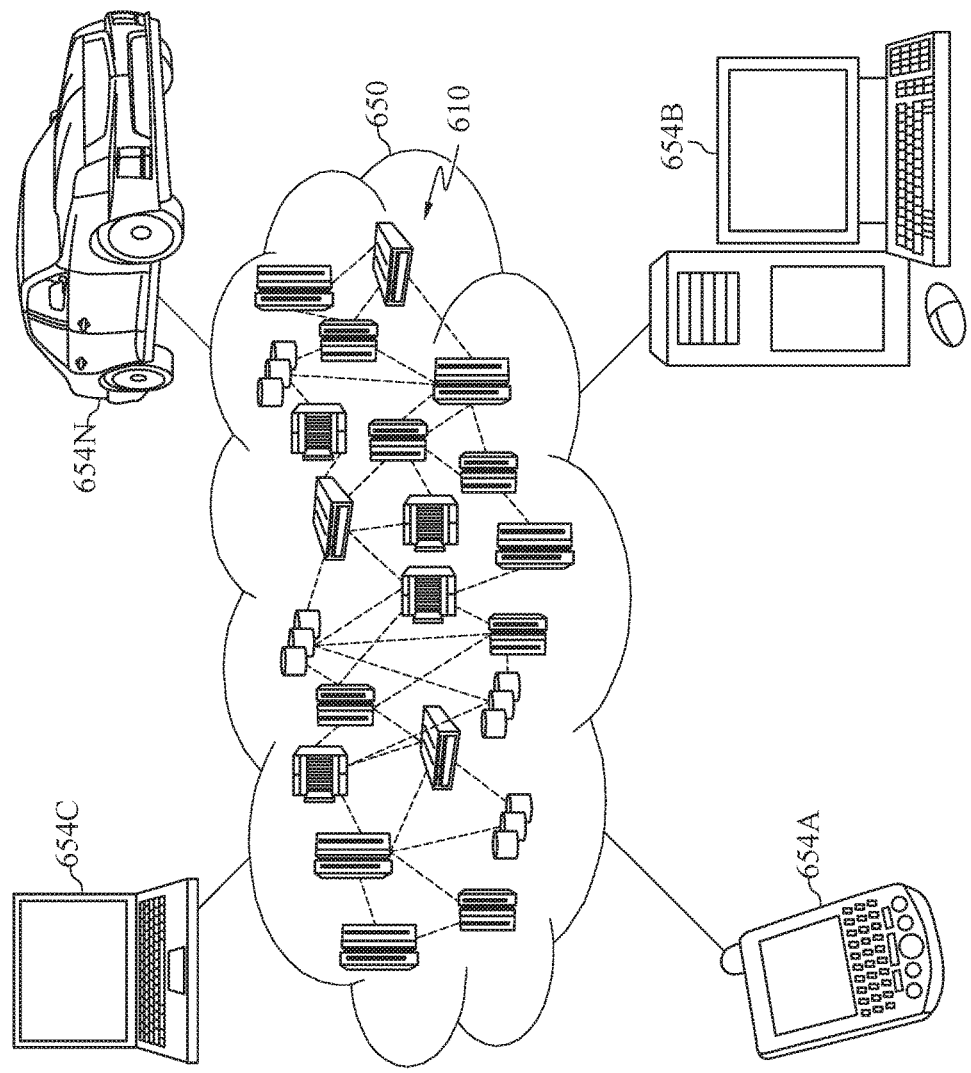
FIG. 6B depicts an illustrative cloud computing environment.

Referring now to FIG. 6B, illustrative cloud computing environment 650 is depicted. As shown, cloud computing environment 650 comprises one or more cloud computing nodes 610 with which local computing devices used by cloud consumers, such as, for example, personal digital assistant (PDA) or cellular telephone 654A, desktop computer 654B, laptop computer 654C, and/or automobile computer system 654N may communicate. Nodes 610 may communicate with one another. They may be grouped (not shown) physically or virtually, in one or more networks, such as Private, Community, Public, or Hybrid clouds as described hereinabove, or a combination thereof. This allows cloud computing environment 650 to offer infrastructure, platforms and/or software as services for which a cloud consumer does not need to maintain resources on a local computing device. It is understood that the types of computing devices 654A-N shown in FIG. 6B are intended to be illustrative only and that computing nodes 610 and cloud computing environment 650 can communicate with any type of computerized device over any type of network and/or network addressable connection (e.g., using a web browser).

Figure 6C:
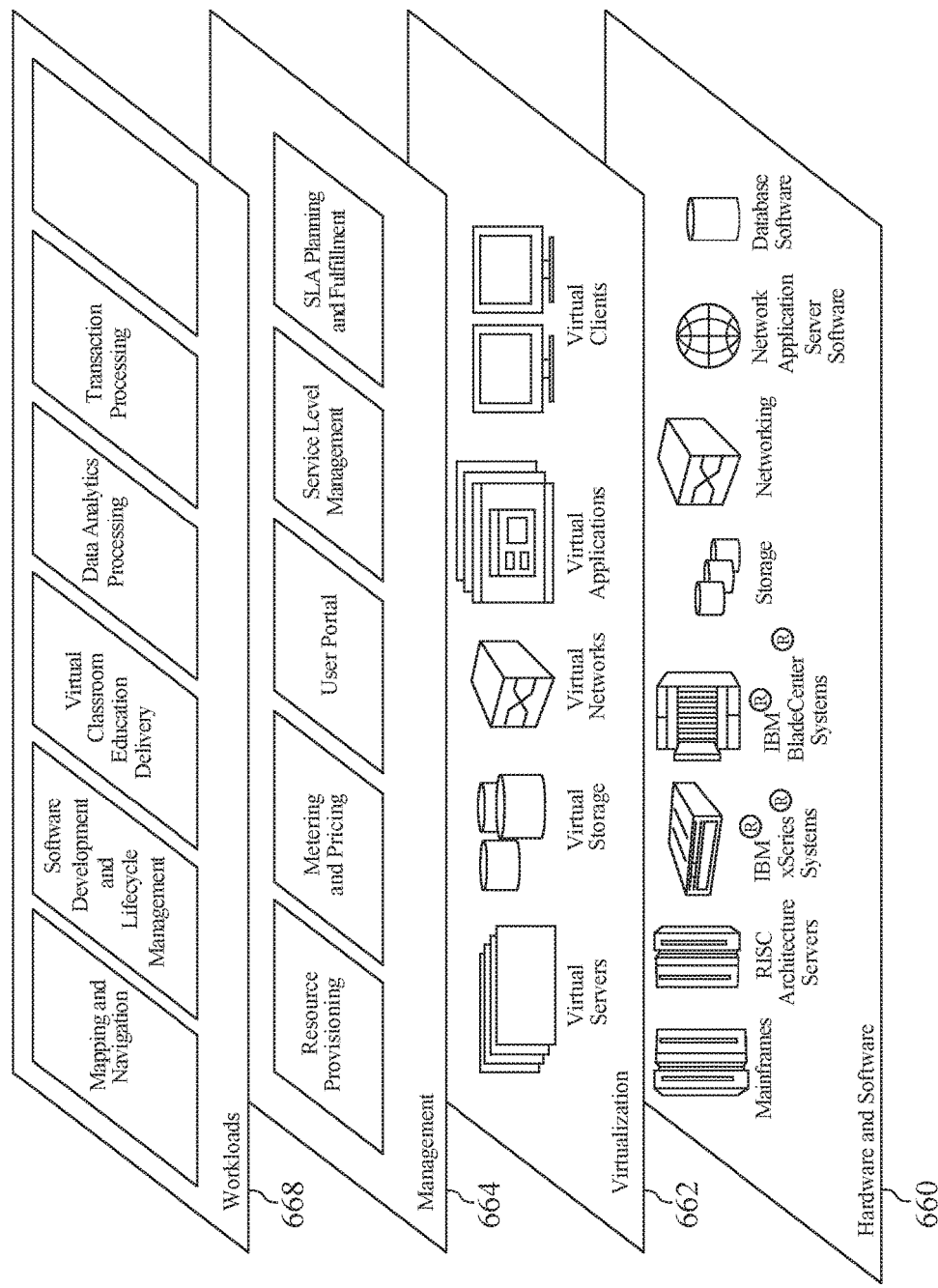
FIG. 6C depicts a set of functional abstraction layers provided by cloud computing environment.

Referring now to FIG. 6C, a set of functional abstraction layers provided by cloud computing environment 650 (FIG. 6B) is shown. It should be understood in advance that the components, layers, and functions shown in FIG. 6C are intended to be illustrative only and embodiments of the invention are not limited thereto. As depicted, the following layers and corresponding functions are provided:

Hardware and software layer 660 includes hardware and software components. Examples of hardware components include: mainframes; RISC (Reduced Instruction Set Computer) architecture based servers; servers; blade servers; storage devices; and networks and networking components. In some embodiments, software components include network application server software and database software.

Virtualization layer 662 provides an abstraction layer from which the following examples of virtual entities may be provided: virtual servers; virtual storage; virtual networks, including virtual private networks; virtual applications and operating systems; and virtual clients.

In one example, management layer 664 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 668 provides examples of functionality for which the cloud computing environment may be utilized. Examples of workloads and functions which may be provided from this layer include: mapping and navigation; software development and lifecycle management; virtual classroom education delivery; data analytics processing; transaction processing; and mobile desktops.

The present invention may be a system, a method, and/or a computer program product. The computer program product may include a computer readable storage medium (or media) having computer readable program instructions thereon for causing a processor to carry out aspects of the present invention. The computer readable storage medium can be a tangible device that can retain and store instructions for use by an instruction execution device.

The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions. These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A computer system for automated application composition comprising:

a memory;
an interface configured to receive a natural language input; and
a processor in communication with the memory, wherein the computer system is configured to perform a method, the method comprising:
receiving the natural language input via the interface, the natural language input comprising one or more application requirements;
parsing the natural language input to extract one or more chunks, each chunk being a portion of the natural language input that represents one of the one or more application requirements, at least one of the one or more chunks representing at least one of one or more main functionalities described by the one or more application requirements;
inferring a coarse architecture according to the one or more chunks, the coarse architecture logically arranging the one or more main functionalities to satisfy the one or more application requirements;
identifying existing assets corresponding to the one or more chunks, each asset associated with at least one of the one or more main functionalities;
assembling the identified assets according to the coarse architecture; and
deploying the assembled assets as an application.

2. The system of claim 1, wherein an asset is a basic asset, comprising one a service or an action.

3. The system of claim 1, wherein an asset is a complex asset, comprising two or more basic assets.

4. The system of claim 1, further comprising an internal repository of assets stored in the memory.

5. The system of claim 1, further comprising an external repository of assets in communication with the processor.

6. The system of claim 5, wherein the external repository of assets is stored in a cloud storage.

7. The system of claim 1, wherein the natural language input is analyzed according to at least one of phonology, morphology, lexicology, pragmatics, syntax, and semantics.

8. A method of automated application composition comprising:
receiving a natural language input, the natural language input comprising one or more application requirements;
parsing the natural language input to extract one or more chunks, each chunk being a portion of the natural language input that represents one of the one or more application requirements, at least one of the one or more chunks representing at least one of one or more main functionalities described by the one or more application requirements;
inferring a coarse architecture according to the one or more chunks, the coarse architecture logically arranging the one or more main functionalities to satisfy the one or more application requirements;
identifying existing assets corresponding to the one or more chunks, each asset associated with at least one of the one or more main functionalities;
assembling the identified assets according to the coarse architecture; and
deploying the assembled assets as an application.

9. The method of claim 8, wherein the data flow is generated according to semantic matching with the one or more chunks.

10. The method of claim 8, wherein assembling the identified assets comprises aligning the identified assets with the data flow.

11. The method of claim 8, further comprising receiving a second natural language input in response to the application, such that the second natural language input provides feedback on the application.

12. The method of claim 8, wherein the natural language input is a problem description.

13. The method of claim 8, wherein the natural language input is a description of desired functionality for the application.

14. The method of claim 8, wherein two or more data flows are inferred from the one or more chunks.

15. The method of claim 14, further comprising assembling a second application according to a second coarse architecture comprising a second of the two or more data flows; and
deploying the second application in parallel with the application, the application assembled according to a first coarse architecture comprising a first of the two or more data flows.

16. The method of claim 8, further comprising determining that two or more assets are identified to achieve a main functionality of the one or more main functionalities; and
selecting, in response to determining that two or more assets are identified to achieve a main functionality of the one or more main functionalities, a first asset of the two or assets identified to achieve the main functionality.

17. The method of claim 16, further comprising assembling a second application using a second asset of the two or assets identified to achieve the main functionality; and
deploying the second application in parallel with the application.

18. The method of claim 8, further comprising analyzing each chunk of the one or more chunks to produce a first-order logic representation of the respective chunk, wherein together the respective first-order logic representations for all of the plurality of chunks comprise the data flow.

19. The method of claim 8, further comprising identifying that a main functionality of the one or more main functionalities is not satisfied by any of the existing assets.

20. A computer program product for automated application composition, the computer program product comprising a computer readable storage medium having program instructions embodied therewith, wherein the computer readable storage medium is not a transitory signal per se, the program instructions executable by a processor to perform a method comprising:
receiving a natural language input, the natural language input comprising one or more application requirements;
parsing the natural language input to extract one or more chunks, each chunk being a portion of the natural language input that represents one of the one or more application requirements;
inferring a coarse architecture according to one or more main functionalities required by the one or more application requirements, wherein the coarse architecture comprises a data flow of the one or more chunks;
identifying existing assets corresponding to the one or more chunks, each asset associated with at least one of the one or more main functionalities;
assembling the identified assets according to the coarse architecture; and
deploying the assembled assets as an application.

* * * * *